US009143513B2

(12) United States Patent
Bertin

(10) Patent No.: US 9,143,513 B2
(45) Date of Patent: Sep. 22, 2015

(54) PORTABLE ELECTRONIC DEVICE AND ASSOCIATED METHOD FOR MAKING INFORMATION AVAILABLE

(75) Inventor: Marc Bertin, La Celle les Bordes (FR)

(73) Assignee: OBERTHUR TECHNOLOGIES, Colombes (FR)

(*) Notice: Subject to any disclaimer, the term of this patent is extended or adjusted under 35 U.S.C. 154(b) by 392 days.

(21) Appl. No.: 12/964,135

(22) Filed: Dec. 9, 2010

(65) Prior Publication Data

US 2011/0150222 A1 Jun. 23, 2011

(30) Foreign Application Priority Data

Dec. 23, 2009 (FR) ...................................... 09 59534

(51) Int. Cl.
*H04K 1/00* (2006.01)
*H04L 29/06* (2006.01)
*H04W 12/08* (2009.01)
*H04W 88/06* (2009.01)

(52) U.S. Cl.
CPC .............. *H04L 63/102* (2013.01); *H04L 63/10* (2013.01); *H04L 63/105* (2013.01); *H04W 12/08* (2013.01); *H04W 88/06* (2013.01)

(58) Field of Classification Search
CPC .............................. H04L 63/10; H04L 63/102
USPC ......................................................... 380/270
See application file for complete search history.

(56) References Cited

U.S. PATENT DOCUMENTS 6,130,623 A * 10/2000 MacLellan et al. ............. 340/5.1
7,512,985 B1 * 3/2009 Grabarnik et al. .............. 726/26
8,085,680 B1 * 12/2011 Craine .......................... 370/252
2002/0046176 A1 * 4/2002 Seo et al. ......................... 705/51
2003/0046576 A1 * 3/2003 High et al. ..................... 713/200
2006/0015499 A1 * 1/2006 Clissold et al. .................. 707/9
2006/0146765 A1 7/2006 Van De Sluis et al.

(Continued)

FOREIGN PATENT DOCUMENTS

EP 1553729 A1 7/2005
EP 2038799 A2 3/2009

(Continued)

OTHER PUBLICATIONS

Kehr et al., "Look, Ma, My Homepage is Mobile," Personal Technologies, Springer, London, GB LNKD-DOI: 10.1007/S007790070006, vol. 4, No. 4, Jan. 1, 2000, pp. 217-220, Sections 2 and 5, Cited in French Search Report.

(Continued)

*Primary Examiner* — Peter Shaw
(74) *Attorney, Agent, or Firm* — Young & Thompson

(57) ABSTRACT

A portable electronic device includes at least one near-field or medium-field wireless communication interface (1600-1900) and at least two information elements in a memory (1410) and wherein at least two different access modes (1420) may be associated with each information element, a user is able to associate an access mode with an identifier representing a third party electronic entity via a man-machine interface (1200) during a configuration phase, and at least one information item can thereafter be made available to a third party electronic entity by cryptographic elements (1430) and the wireless communication interface during a utilization phase as a function of an access mode previously associated with both the identifier representing the third party electronic entity and the information element.

13 Claims, 3 Drawing Sheets

(56) References Cited

U.S. PATENT DOCUMENTS

| | | |
|---|---|---|
| 2006/0177010 A1* | 8/2006 | Skakkebaek et al. ........ 379/67.1 |
| 2008/0079573 A1 | 4/2008 | Bloebaum et al. |
| 2009/0144550 A1* | 6/2009 | Arunan ..................... 713/171 |
| 2009/0206984 A1 | 8/2009 | Charrat et al. |
| 2010/0131675 A1* | 5/2010 | Pan ........................... 709/247 |
| 2011/0004913 A1* | 1/2011 | Nagarajan et al. ............. 726/1 |
| 2011/0213978 A1* | 9/2011 | Fouchard .................... 713/171 |

FOREIGN PATENT DOCUMENTS

| | | |
|---|---|---|
| GB | 2408121 A | 5/2005 |
| WO | 2008008243 A2 | 1/2008 |
| WO | 2008085131 A1 | 7/2008 |
| WO | 2009023858 A2 | 2/2009 |

OTHER PUBLICATIONS

Risto et al., "Mobshare: Controlled and Immediate Sharing of Mobile Images" Proceedings of the ACM International Conference Onmultimedia, New York, NY, US, Oct. 10, 2004, pp. 724-731, Section 2, Cited in French Search Report.

Moeiz et al., "Dynamic Context-Aware Service Adaptation in a Pervasive Computing System" Mobile Ubiquitous Computing, Systems, Services and Technologies, 2009. UBICOMM 09. Third International Conference on IEEE, Piscataway, NJ, USA, Oct. 11, 2009, pp. 77-82, Sections III and IV, Cited in French Search Report.

French Search Report, dated Sep. 24, 2010, from corresponding French application.

* cited by examiner

PORTABLE ELECTRONIC DEVICE AND ASSOCIATED METHOD FOR MAKING INFORMATION AVAILABLE

BACKGROUND OF THE INVENTION

1. Field of the Invention

The invention relates to a portable electronic device and an associated method for making information available. It implies in particular a methodology for configuration of electronic entities interacting within the framework of an ad hoc network, i.e. a network in which the electronic entities are organized to communicate with each other via wireless communication media with no predefined infrastructure.

The invention aims to simplify the use of wireless communication and more specifically to simplify the process of configuring the use of wireless communication for users exchanging information with different exchange criteria in a social exchange context (linked with digital exchange networks such as Facebook and the like), a business exchange context (within the framework of a company) or a commercial exchange context (stores, trading rooms).

2. Description of the Related Art

The wireless communication mode may conform to a standard such as the WiFi IEEE 802.11, Bluetooth 802.15.1, Zigbee 802.15.4 or NFC (Near-Field Communication) standard. The information exchanged is notably information with a multimedia or informational content, for example.

The document EP1553729 teaches retrieving an XML file written on a portable medium by an initiation device using a similar device. The portable medium may be lost or damaged and the data that it contains may be corrupted.

The document US2006/0146765 teaches using a shared visual space and makes it possible to transfer content on the basis of manipulation of visual elements representing the content. This is complicated and necessitates prolonged intervention by the user.

SUMMARY OF THE INVENTION

The invention to be described proposes a device and an associated method that facilitate and simplify exchange of information by users of portable electronic devices, thus solving the problems encountered when using known systems.

To be more precise, the present invention proposes a portable electronic device comprising at least one near-field or medium-field wireless communication interface and at least two information elements in a memory, characterized in that at least two different access modes may be associated with each information element, a user being able to associate an access mode with an identifier representing a third party electronic entity via a man-machine interface during a configuration phase, at least one information item that can thereafter be made available to a third party electronic entity by cryptographic means and the wireless communication interface during a utilization phase as a function of an access mode previously associated with both the identifier representing said third party electronic entity and said information element.

The advantages associated with the above device are notably its automatic and user friendly character, involving little intervention by the user once a configuration phase has been completed. No hardware transmission device that has to be connected from one electronic device to the other is necessary.

In one embodiment, making an information element available to a third party electronic entity consists in sending the information element via the wireless communication interface after receiving via the wireless communication interface a request identified as coming from the third party electronic entity.

For example, a request is identified as coming from the third party electronic entity because it contains the identifier associated with the third party electronic entity.

According to an advantageous feature, making an information element available to a third party electronic entity is effected if a latest updating date of a third party electronic entity has been received by the electronic device and that latest updating date is before a modification date of an information element.

Alternatively, making the information available entails sending the information element via the wireless communication interface independently of the reception of a request, with identification and where appropriate authentication when sending from the sender portable electronic device and use of cryptographic means specific to a class of information elements including the sent element. For example, the information element is signed and encrypted by the sender portable device before sending it. The encryption key used in this case is common to the element class so that a third party electronic entity that has previously obtained the corresponding decryption key is able to decrypt the information element but all other third party entities are not able to decrypt it and obtain the information element.

According to another advantageous feature, the information is made available as soon as the electronic device is within range of the third party electronic entity via the wireless communication interface.

In one embodiment, the cryptographic means include a specific pair of asymmetrical keys of the portable electronic device, the public key being supplied to the third party electronic entity beforehand.

For example, the third party electronic entities are represented by identifiers in the form of telephone numbers stored during incoming telephone calls.

The identifiers may also be received via SMS, email, a GSM or GPRS mobile telephone network or a near-field or medium-field wireless communication interface.

In a variant of the present invention, the third party electronic entities are represented by identifiers that are stored in a given entry of the cards of a directory, for example a telephone directory, stored in a memory of the electronic device.

In one embodiment, an access mode includes a profile code, a profile defining rights of access for the information elements, possibly grouped into information element classes.

In a situation in which the device includes at least two wireless communication interfaces and an access mode includes a profile code, a profile further defining at least access rights for the information elements, possibly grouped into information element classes, the access rights possibly differing as a function of the wireless communication interface used.

In an advantageous embodiment, an access mode includes a list of logic rules used by automatic logic deduction software.

In some embodiments, making an information item available to a third party electronic entity may be activated or deactivated by the user.

Generally speaking, the wireless communication interface is an NFC (near field communication), BLUETOOTH (short range radio frequency), ZIGBEE (IEEE 902.15.4) or WIFI (IEEE 802.11) interface or an interface that conforms to some other standard. The maximum range of the wireless communication interface is preferably less than 100 meters, or even less than 50 meters. Thus the invention makes it possible for persons to exchange information automatically only when they are in the same place.

It is particularly beneficial to implement the invention with information elements that consist of digital audio files, news or blog pages.

In some alternative embodiments, the access modes are preconfigured in a memory of the device, received beforehand via SMS or defined beforehand by the user via a man-machine interface.

The invention finally proposes a method of making available to a third party electronic entity an information element contained in an electronic device, characterized in that it includes the following steps:

receiving a request containing an identifier of the third party electronic entity via a near-field or medium-field wireless communication interface, sending the information element via the near-field or medium-field wireless communication interface and cryptographic means as a function of an access mode associated beforehand with both the identifier of said third party electronic entity and said information element.

The advantages associated with this method are notably its automatic and user friendly character, involving little intervention by the user once a configuration phase has been completed. No hardware transmission device that has to be connected from one electronic device to the other is necessary.

BRIEF DESCRIPTION OF THE DRAWING FIGURES

The invention is described next with reference to the appended figures.

DETAILED DESCRIPTION OF THE INVENTION

Figure 1:
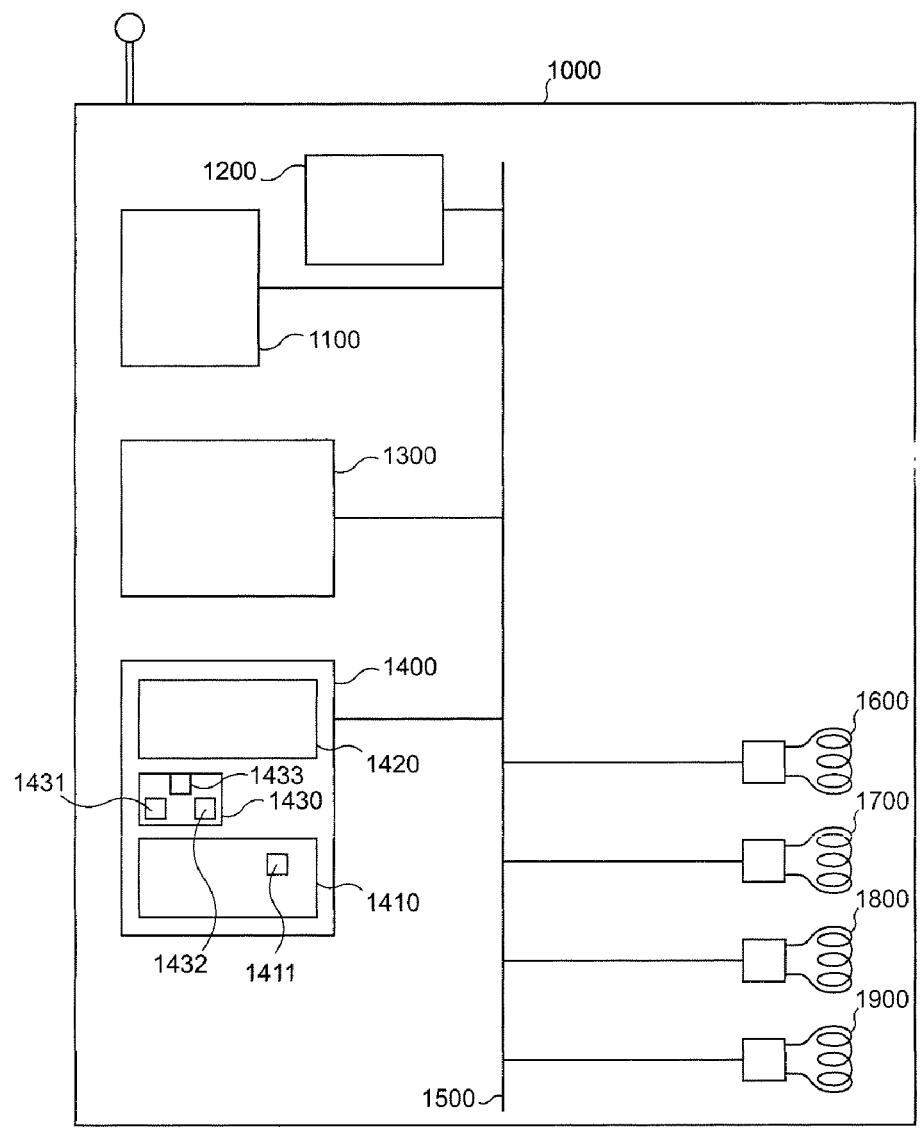
FIG. 1 represents a device of one embodiment of the invention.

FIG. 1 shows a portable electronic entity 1000 that comprises a first near-field interface 1600, a second near-field interface 1700, a near-field or medium-field interface 1800 and a medium-field interface 1900. A near-field interface is characterized by a range of less than 1 meter and a medium-field interface is characterized by a range between 1 meter and 100 meters. These interfaces may conform to the Bluetooth, WiFi or ZigBee standard, for example. Other interfaces conforming to other near-field, medium-field or far-field standards may be used, for example a USB wireless interface.

The portable electronic entity 1000 also includes a communication bus 1500 connected to the four interfaces 1600, 1700, 1800 and 1900. The portable electronic entity 1000 further includes a screen 1100 and a man-machine interface 1200. Here this is a keypad but it could equally be a knob or just a joystick.

The portable electronic entity 1000 further includes a microprocessor 1300 and a non-volatile memory 1400 which here is a flash memory; it could equally be an EEPROM. The screen 1100, the keypad 1200, the microprocessor 1300 and the memory 1400 are connected to the communication bus 1500.

The memory 1400 also includes an area 1410 dedicated to personal data such as digital audio files or news, for example.

The area 1410 dedicated to personal data comprises a news area 1411 that is a memory area that contains news of current interest, for example, music, films, favorite photos, pages from the telephone owner's blog or the latest gossip.

The memory 1400 includes an area 1420 dedicated to access rules described hereinafter that define the modes of access by third parties to personal data contained in the area 1410.

The memory 1400 further includes a secure area 1430 that cannot be modified by an entity external to the portable electronic entity 1000. The secure area 1430 contains a private key 1433, a public key 1432 of a certification authority and, finally, a cryptographic certificate 1431 that contains an identifier ID1 and a public key pub1. The private key 1433 is associated with the public key pub1 by a cryptographic pairing relationship known to the person skilled in the art.

The portable electronic entity 1000 is used by a user 1. A portable electronic entity 2000, which may be similar to the portable electronic entity 1000, is used by a user 2. The portable electronic entity 2000 may also be of a different kind to the entity 1000, one being a mobile telephone and the other a portable digital assistant (PDA), for example, and includes elements identified by reference numbers deduced from the reference numbers of the electronic entity 1000 by adding 1000.

Figure 2:
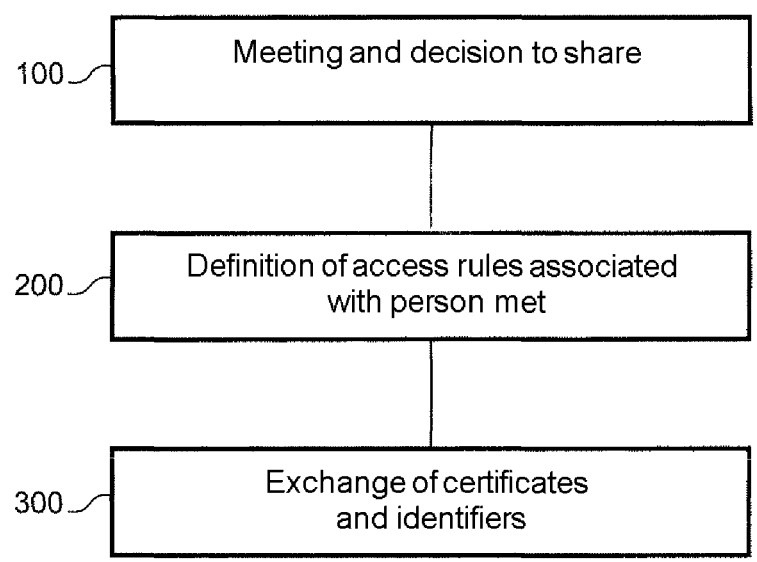
FIG. 2 represents a configuration phase.

FIG. 2 represents one scenario for a phase of configuring the device 1000; during an encounter and decision step 100, the user 1 of the portable electronic entity 1000 decides to configure their device 1000 so that it shares its personal data from the area 1410 with the user 2 of the portable electronic device 2000 who they have just met.

During a step 200 the user 1 launches an application AP1 for modifying the access rules 1420 using the screen 1100 and the man-machine interface 1200. The application AP1 is stored in a memory of the portable electronic entity 1000, for example a non-volatile memory such as the memory 1400 or a read-only memory (ROM), for example ROM in the microprocessor 1300. It is executed by the microprocessor 1300. The application AP1 may be replaced by a function F1 of a broader application that is executed continuously by the microprocessor 1300 and is launched on powering up the portable electronic entity 1000 by an automatic start-up system, for example. Such a function F1 may be used by selecting a menu item from a menu displayed by the broader application, for example.

The user enters instructions via the screen 1100 and the interface 1200 so that the application AP1 obtains an identifier ID via the interface 1600. The identifier ID must be introduced into the access rules 1420 and must represent the user 2. To indicate that it is ready to acquire a new identifier ID the application AP1 displays a message on the screen 1100 or alternatively emits a sound (or causes a vibrator to vibrate).

The user 2 launches an application AP2 (similar to the application AP1) in exactly the same way on their portable electronic entity 2000. The users 1 and 2 then place the portable electronic entities 1000 and 2000 at a distance from each other enabling communication via one of their communication interfaces.

In a step 300, the two applications then exchange their cryptographic certificates 1431 and 2431. The application AP1 verifies the cryptographic certificate 2431 using the public key 1432. If the certificate 2431 is valid, the application AP1 asks the user 1 to enter the access rules for the identifier ID2 via the man-machine interface and then stores those access rules in the memory area 1420 dedicated to access rules.

The application AP1 also stores the cryptographic certificate 2431 in the non-volatile memory 1400. To be more precise, the application AP1 stores the cryptographic certificate 2431 in the secure memory area 1430. Symmetrically, the application AP2 stores the cryptographic certificate 1431 in the secure memory area 2430.

The application AP2 executes similar steps in the portable electronic entity 2000. In an alternative use scenario, only the user 2 gives their certificate to the user 1.

In a variant, the identifier ID2 has a meaning for human users according to a predefined convention and contains for example the name or forename of the user 2. In this variant the application AP1 commands display of at least part of the identifier ID2 on the screen 1100. In this variant the cryptographic certificate 2431 may also contain another identifier with specific meaning for the user 1. This other identifier is used during the display referred to above.

The access rules are entered by the user 1 using the interface 1200 and the screen 1100. In one embodiment this input step consists in associating with the identifier ID2 a profile code, for example a profile number. This profile number is for example a token certificate (or authenticator) ID inscribed in the access rules 1420.

In one embodiment, the identifier ID2 is associated with a profile. Profiles may be entered beforehand by the user via the screen 1100 and the interface 1200. In a variant, profiles are preconfigured in the device 1000. In another variant, they are received via SMS prior to the step 100.

In an alternative embodiment the cryptographic certificates 1431 and 2431 and the identifiers ID1 and ID2 are exchanged over an Internet type network by messages, for example SMS or electronic mail messages, during the steps 100 to 300.

In another variant, the cryptographic certificates and the identifiers are obtained via an incoming call telephone number: at the end of the call, the user 1 commands the application AP1 via the interface 1200 to create rules for the caller, those rules being stored in the memory area 1420 dedicated to access rules.

In this case the identifier is the incoming call telephone number, for example, or an entry in a directory of the portable electronic entity 1000 stored in one of its memories.

In another variant, the identifier is entered by the user 1 via the interface 1200 of the portable electronic entity 1000.

In one embodiment, the portable electronic entity 1000 includes an application for connecting to a Facebook type social network and when the user 1 adds an entry representing a contact an identifier corresponding to the new entry is added to the access rules stored in area 1420 automatically, for example by a server sending a message (for example an SMS message) via the GPS or GPRS mobile telephone network to the portable electronic entity 1000. Rules are defined beforehand when registering with the social network.

In a variant, this addition is effected non-automatically by confirmation of the user 1, who may then define access rules in the dedicated area 1420.

In one embodiment, the portable electronic entity 1000 contains a phonebook application.

In one embodiment the access rules 1420 consist of a decision table. Three decision tables are described next that may be used as access rules 1420 in respective embodiments.

A first decision table 1421 is described next that comprises two columns: a first column relating to a level of confidentiality and a second column relating to a precise category of personal data. An example is given below.

| Level | Personal data |
|---|---|
| 3 | Secret files (list of file names) |
| 2 | Music files for friends |
| 1 | News |

A second decision table example is given next: the second decision table 1422. Each row corresponds to a community or group of persons or profiles.

| Token certificate ID | Level of confidentiality | Community | Communication | | | |
|---|---|---|---|---|---|---|
| | | | NFC | Zigbee | WiFi | USB |
| 1 | 3 | friends | X | | | X |
| 2 | 1 | public | | | X | X |
| ... | | | | | | |
| m | 3 | "home" fellow tenants | | X | | |

This table comprises four columns. The first column gives a profile number identified by a certificate or authenticator (token). The second column gives the level of confidentiality on a scale of 1 to 3, 1 representing the lowest level and 3 representing the highest level.

The third column gives all persons for whom the information in the row is intended. The fourth column gives the communication mode, here the type of wireless communication interface used, for example. Four types of interface are represented: a near-field communication (NFC) interface, a Zigbee interface, a WiFi interface, and, finally, a USB wireless interface. For each profile some communication interfaces are open (as represented by a cross) and others are closed.

In the situation shown, for the profile 1 corresponding to all friends of the user 1 (defined for example by the list of identifiers in the list of contacts in a telephone directory or a community application such as Facebook), the NFC and USB interfaces are authorized. For the profile 2 corresponding here to all persons physically able to enter into communication with the user 1 (persons in the neighborhood or persons in a building, such as a store or a company building), without restriction, communication via the WiFi and USB wireless interfaces is authorized.

Finally, for the profile m corresponding to all members of the close family of the user 1, for example, the electronic entities of the user or all the user's fellow tenants, only communication via the Zigbee interface is authorized.

Note that the level of confidentiality added to the public (profile 2) is the lowest, as it has the value 1, whereas the levels of confidentiality associated with the profiles 1 and m are high, as this level of confidentiality is on a scale of 1 to 3.

In the case of authorization of an automatic connection for an authorized network if the identifier is an element corresponding to a profile number from the decision table 1422 the call is set up.

A third decision table 1423 is described next. This comprises an Identifier column and a Profile number column defining a profile associated with each third party defined by an identifier. The profiles are defined as described above.

| Identifier | Profile number |
|---|---|
| ID2 | 2 |
| ... | |

The access rules may also consist in a list of logical rules used by automatic logical deduction software, for example stored in an interface with a non-volatile memory 1400 or in ROM, to deduce or authorize sending from the application AP1 to the application AP2, for example on reception of the identifier ID2 or on reception of a request.

For example, the access rules include a rule R "I communicate via Zigbee only with my friends". The access rules also include a second rule R2 "the person identified by the identifier ID2 is a friend". The access rules finally include a third rule R3 "I can send the music file to my friends".

In one example of a scenario, the portable electronic entity 1000 receives a request RQ to the effect that "the person identified by the identifier ID2 wishes to be sent the music file".

The portable electronic entity 1000 performs an automatic deduction step and decides to send the music file via the interface 1900, as a consequence of the predefined rules and the request RQ.

Figure 3:
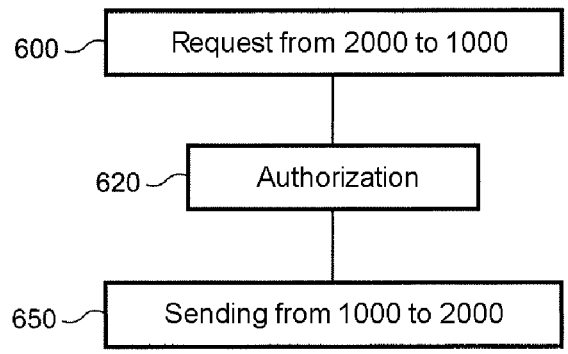
FIGS. 3 and 4 represent scenarios of phases of use during the use of one embodiment of the invention.

Referring to FIG. 3 showing a phase of use, in the continuation of the previous scenario the users 1 and 2 and therefore the electronic entities 1000 and 2000 are sufficiently close together to communicate via a near-field or medium-field interface (near-field interface 1600, second near-field interface 1700, near-field or medium-field interface 1800 or medium-field interface 1900). The application AP2 then sends the application AP1 the identifier ID2 via the second near-field interface 2700, for example. It must be remembered that applications can run continuously on the electronic entities 1000 and 2000.

For example, the identifier ID2 may be communicated in a request Req in the form shown hereinafter, during a request transmission step 600:

| Code defining a request to obtain data | ID2 | C1 (code of the wireless interface to use to respond) | F1 (data type code, identification of area of data to recover or name of file to recover) |
|---|---|---|---|

The request Req or the identifier ID2 is sent automatically by the application AP2 via the interface mentioned above, i.e. without intervention of the user 2, who may leave the device 2000 in their pocket, for example, as can the user 1.

For example, the request Req may be sent via the interface 2700 by the microprocessor 1300 regularly and at short intervals without stopping, automatically or systematically on reception of an external signal via the interface 1700.

On reception of the request Req, the application AP1 looks up the identifier ID2 in the third decision table 1423 and finds that this identifier is associated with profile 2. The application AP1 then verifies in the first decision table 1421 if the data type code F1 allows sending of the data requested for profile 2. The application AP1 also verifies in the decision table 1422 if the interface may be used.

If the above verifications are all positive (which defines an authorization 620), the application AP1 encrypts the data corresponding to the data type code F1 after reading it in the news memory area 1411. Coding is effected with the private key priv1. The application AP1 sends the data corresponding to the data type code F1 encrypted in this way via the interface corresponding to the code C1. The code F1 is sent with the identifier ID2, for example, so that all portable electronic entities within range of the portable electronic entity 1 except the device 2000 know that the content sent is not intended for them.

The following information is therefore sent via the wireless interface identified by the code C1 (step 650):

| Code defining a sending of data | ID2 | Encrypted requested content |
|---|---|---|

As at least some of the data corresponding to the data type code F1 is encrypted with the private key priv1, only users who have the public key pub1 corresponding to priv1 are able to read the sent content.

Figure 4:
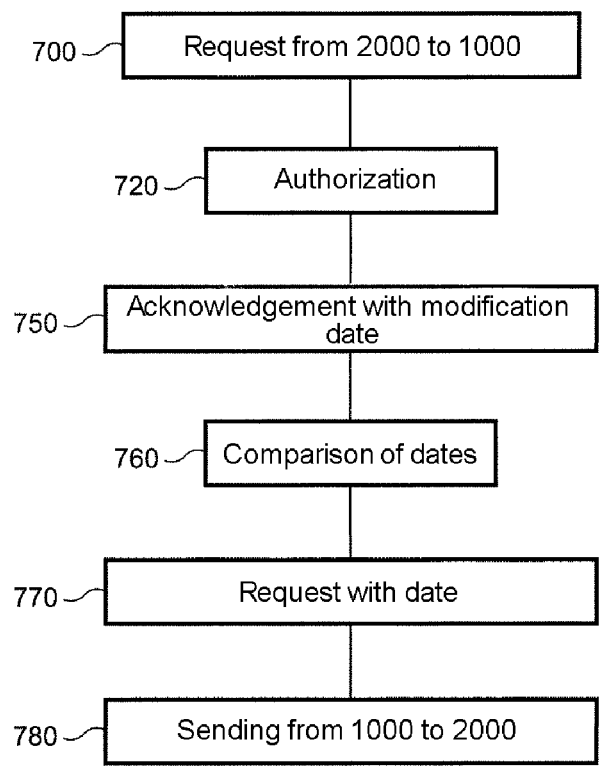

In an embodiment represented in FIG. 4, which begins with a step 700 similar to the step 600 described above, after verifying the access rules and obtaining an authorization 720, the application AP1 can respond to the application AP2 via the second near-field interface 1600, for example, initially by giving the date of modification of the data corresponding to the data type code F1. In a variant this is the date of the last document modified.

The portable electronic entity 1000 therefore sends the following acknowledgement sequence ack during a step 750:

| Header defining an acknowledgement ack | ID1 (identifier of device 1000) | ID2 (identifier of sender of request) | date of last modification of data with data type code F1 (date 2) |
|---|---|---|---|

When the application AP2 receives the acknowledgement ack it verifies that the identifier ID of the request sender is equal to the identifier ID2. The application AP2 also verifies that the identifier ID of the receiver is equal to the identifier ID1.

In a variant, the request contains a request number present in the acknowledgement sequence ack.

If these two identifications are positive, in a comparison step 760 the application AP2 compares the latest date of modification of the code F1 with a value that it has saved in the non-volatile memory 2400 corresponding to the date of the last request with the identifier ID1.

In a variant, the value saved in non-volatile memory 2400 in a table as shown below is determined as a function of the last exchange effected with the device 1000, identified by the identifier 1000.

| ID1 | Date1 |
|---|---|
| ... | |
| ... | |

If Date2 is after Date1, the application AP2 sends the request Req again during a step 770, adding the current date to it at the end. Thus the following request Req2 is sent:

| Request | ID2 | C1 | F1 | Date1 |
|---|---|---|---|---|
| header with date | (identifier) | interface code | data type code | |

The application AP1 processes the request Req2 like the request Req except that, during a step 780, the application AP1 sends only the elements corresponding to the data type code F1 having a creation or modification date later than Date1.

The request and the response are sent automatically without intervention of the user. At most the user activates or deactivates the function as required.

In a variant, the application AP1 and the application AP2 create a secure channel between the portable electronic entities 1000 and 2000.

According to the invention, it is thus possible to exchange information such as MP3 files, HTML links, news or visiting cards with third parties, for example friends, colleagues or persons having the same interests, for example sharing the same identifier and located in the same place at a distance corresponding to one of the interfaces of the electronic entity 1000.

The invention is not limited to the embodiments described but encompasses all variants obvious to the person skilled in the art.

The invention claimed is:

1. A portable electronic device, comprising: at least one near-field or medium-field wireless communication interface; and at least one information element in a memory; a man-machine interface configured to be used by a first user upon prompting, for associating a received identifier with one of a plurality of access modes during a phase of configuration of the portable electronic device, by defining access rules for an identified second user to access said at least one information element, said access rules including said identifier and being stored in said memory; and cryptographic means configured to make available said at least one information element to a third party electronic entity, via said wireless communication interface, in response to a request comprising the identifier of the identified second user, in accordance with the access rules defined and stored for the identified second user and for said at least one information element, wherein at least two different access modes are associated with each information element, and making at least one of said at least one information element available to said third party electronic entity is effected if a latest updating date of a third party electronic entity has been sent to the electronic device and said latest updating date is before a modification date of the at least one information element.

2. The electronic device according to claim 1, wherein making said at least one of said information element available to said third party electronic entity comprises sending said at least one information element via the wireless communication interface after receiving via the wireless communication interface a request identified as coming from the third party electronic entity.

3. The electronic device according to claim 1, wherein the information is made available as soon as the electronic device is within range of the third party electronic entity via the wireless communication interface.

4. The electronic device according to claim 1, wherein the cryptographic means include a specific pair of asymmetrical keys of the portable electronic device, a public key being supplied to the third party electronic entity beforehand.

5. The electronic device according to claim 1, wherein the third party electronic entities are represented by identifiers which are telephone numbers stored during incoming telephone calls.

6. The electronic device according to claim 1, wherein the third party electronic entities are represented by identifiers that are stored in a given entry of a directory or a telephone directory, stored in a memory of the electronic entity.

7. The electronic device according to claim 1, wherein an access mode includes a profile code defining rights of access for the information elements, grouped into information element classes.

8. The electronic device according to claim 1, wherein the electronic device includes at least two wireless communication interfaces and an access mode including a profile code defining at least access rights for said at least one information element, grouped into information element classes, the access rights differing as a function of the wireless communication interface used.

9. The electronic device according to claim 1, wherein an access mode includes a list of logic rules used by automatic logic deduction software.

10. The electronic device according to claim 1, wherein making an information item available to a third party electronic entity may be activated or deactivated by the user.

11. The electronic device according to claim 1, wherein the wireless communication interface is a near field communication interface, a short range radio frequency interface, an IEEE 902.15.4 interface or an IEEE 802.11 interface.

12. The electronic device according to claim 1, wherein the information elements are digital audio files, news or blog pages.

13. The electronic device according to claim 1, wherein the access modes are preconfigured in a memory of the device, received beforehand via SMS or defined beforehand by the user via a man-machine interface.

* * * * *